(12) United States Patent
Xu et al.

(10) Patent No.: US 10,488,731 B2
(45) Date of Patent: Nov. 26, 2019

(54) DISPLAY PANEL, MANUFACTURING METHOD THEREOF AND DISPLAY DEVICE

(71) Applicants: BOE TECHNOLOGY GROUP CO., LTD., Beijing (CN); CHENGDU BOE OPTOELECTRONICS TECHNOLOGY CO., LTD., Sichuan (CN)

(72) Inventors: Yuanjie Xu, Beijing (CN); Pengcheng Zang, Beijing (CN); Ting Li, Beijing (CN); Xiaohui Wu, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

(*) Notice: Subject to any disclaimer, the term of this patent is extended or adjusted under 35 U.S.C. 154(b) by 102 days.

(21) Appl. No.: 15/677,875

(22) Filed: Aug. 15, 2017

(65) Prior Publication Data

US 2018/0101081 A1    Apr. 12, 2018

(30) Foreign Application Priority Data

Oct. 10, 2016    (CN) .......................... 2016 1 0885402

(51) Int. Cl.
*G02B 26/00*    (2006.01)
*G02F 1/167*    (2019.01)
(Continued)

(52) U.S. Cl.
CPC .......... *G02F 1/167* (2013.01); *G02F 1/13439* (2013.01); *G02F 1/133524* (2013.01);
(Continued)

(58) Field of Classification Search
CPC .. G02B 6/0068; G02B 6/0031; G02B 6/0073; G02B 6/0091; G02B 5/0278; G02B 5/09;
(Continued)

(56) References Cited

U.S. PATENT DOCUMENTS

2009/0201570 A1    8/2009    Frazier et al.
2015/0146273 A1*   5/2015    Whitehead .............. G02F 1/167
                                                            359/222.1
2016/0349592 A1   12/2016    Goulding et al.

FOREIGN PATENT DOCUMENTS

CN    101160547 A    4/2008
CN    105579900 A    5/2016
CN    105940344 A    9/2016

OTHER PUBLICATIONS

First Office Action for Chinese Application No. 201610885402.3, dated May 9, 2017, 7 Pages.
(Continued)

*Primary Examiner* — Brandi N Thomas
(74) *Attorney, Agent, or Firm* — Brooks Kushman P.C.

(57) ABSTRACT

A method for manufacturing a display panel provided in an embodiment according to the present disclosure comprises: forming a light reflecting member on a support member in such a manner that the light reflecting member comprises a plurality of protruding structures which is arranged on the support member in an array form and surfaces of which define an enclosed area; and forming a first electrode and a light guide in order on the support member formed with the light reflecting member, charged particles being provided between the light reflecting member and the first electrode.

17 Claims, 7 Drawing Sheets

(51) Int. Cl.
*G02F 1/1335* (2006.01)
*G02F 1/1343* (2006.01)
*G02F 1/19* (2019.01)
*G02F 1/1676* (2019.01)

(52) U.S. Cl.
CPC .. *G02F 1/133553* (2013.01); *G02F 1/134309* (2013.01); *G02F 1/19* (2013.01); *G02F 1/1676* (2019.01); *G02F 2201/122* (2013.01)

(58) Field of Classification Search
CPC .... G02B 5/201; G02B 6/0001; G02B 6/0008; G02B 6/0051; G02B 6/32; G02B 6/0016; G02F 1/133553; G02F 1/133528; G02F 1/133617; G02F 1/1368; G02F 1/133514; G02F 1/133524; G02F 1/134309; G02F 1/13439; G02F 1/167; G02F 2001/133562; G02F 2001/1676; G02F 2201/122; G02F 1/133345; G02F 1/1334; G02F 1/133526; G02F 1/13362; G02F 1/134363; G02F 1/13454; G02F 1/1347; G02F 1/136259; G02F 2001/133521; G02F 2201/16; G02F 2201/34; G02F 2202/104; G02F 2202/38

USPC ........ 359/237, 242, 265–267, 290–292, 295, 359/296, 298

See application file for complete search history.

(56) References Cited

OTHER PUBLICATIONS

Chinese Search Report and Written Opinion for Application No. 201610885402.3, dated Feb. 16, 2017, 8 Pages.

\* cited by examiner

DISPLAY PANEL, MANUFACTURING METHOD THEREOF AND DISPLAY DEVICE

CROSS-REFERENCE TO RELATED APPLICATION

This application claims priority to Chinese Patent Application No. 201610885402.3 filed on Oct. 10, 2016, which is incorporated herein by reference in its entirety.

TECHNICAL FIELD

The present disclosure relates to the field of display technology, and in particular to a display panel, manufacturing method thereof, and a display device.

BACKGROUND

A total internal reflection display technology is a technology for achieving total internal reflection display by using a light reflecting thin film having characteristics of total internal reflection and charged particles, the principle of which is to change reflection intensity of the light reflecting thin film by adjusting positions of the charged particles, thereby to change the display brightness of the thin film. Display panels based on the total internal reflection display technology have simple structures and are widely used. For these display panels, how to improve the total internal reflection display contrast becomes a main research content at present.

A known display panel includes a support member provided with a lower electrode, the support member provided with the lower electrode is provided with a porous reflecting film that can reflect light, and the support member provided with the porous reflecting film is provided with an upper electrode, and the support member provided with the upper electrode is provided with a light guide. charged particles are provided between the lower electrode and the upper electrode, and located in a low refractive index medium. Under the action of voltage difference between the lower and upper electrodes, the charged particles may move to approach the lower electrode through the porous reflecting film. Part of Light incident on the display panel is reflected by the upper electrode, and part thereof is reflected by the porous reflecting film, so the display panel assumes a bright display state. Or, the charged particles may move to approach the upper electrode through the porous reflecting film, and light incident on the display panel is absorbed by the charged particles, so the display panel assumes a dark display state.

Since the porous reflecting film in the display panel is formed with holes, the porous reflecting film may function to block the charged particles that move up and down, thereby affecting the total reflection display contrast and resulting in poor display effect of the display panel.

SUMMARY

In order to solve the problem of poor display effect of display panel in related art, the present disclosure provides a display panel, manufacturing method thereof and a display device. The present disclosure provides the following technical solutions.

According to a first aspect, the present disclosure provides a method for manufacturing a display panel, which comprises:

forming a light reflecting member on a support member in such a manner that the light reflecting member comprises a plurality of protruding structures which is arranged on the support member in an array form and surfaces of which define an enclosed area; and forming a first electrode and a light guide in order on the support member formed with the light reflecting member, charged particles being provided between the light reflecting member and the first electrode.

Optionally, the light reflecting member is a second electrode.

Optionally, the forming the light reflecting member on the support member comprised:

forming a second electrode on the support member; and forming a reflecting component comprising the plurality of protruding structures on the support member formed with the second electrode.

Optionally, a protruding structure of the plurality of protruding structures located in a spacing area, which is an area where an orthogonal projection of an area between adjacent first electrodes on the support member is located, has a height larger than the remaining protruding structures.

According to a second aspect, the present disclosure provides a display panel comprising:

a support member;

a light reflecting member provided on the support member; and a first electrode and a light guide arranged in order on the support member provided with the light reflecting member, wherein charged particles are provided between the light reflecting member and the first electrode, wherein the light reflecting member comprises a plurality of protruding structures which is arranged on the support member in an array form and surfaces of which define an enclosed area.

Optionally, the light reflecting member is a second electrode.

Optionally, the light reflecting member comprises a second electrode and a reflecting component, the second electrode is provided on the support member, and the reflecting component is provided on the second electrode and comprises the plurality of protruding structures.

Optionally, a protruding structure of the plurality of protruding structures located in a spacing area, which is an area where an orthogonal projection of an area between adjacent first electrodes on the support member is located, has a height larger than the remaining protruding structures.

Optionally, the reflecting component is made of a metal oxide.

According to a third aspect, the present disclosure provides a display device comprising the display panel as described in the second aspect.

Embodiments of the present disclosure produce the following advantageous effects:

in the method for manufacturing a display panel, the display panel and the display device according to the embodiments of the present disclosure, the support member is formed with the light reflecting member comprising a plurality of protruding structures, the surfaces of the plurality of protruding structures define an enclosed area, and areas between the protruding structures can receive charged particles. As compared with the porous reflecting film in related art, the protruding structures will not block the charged particles moving up and down, and enhance the effect of reflecting light when the display panel assumes a bright display state, and enhance the effect of absorbing light by the charged particles when the display panel assumes a dark display state. Therefore, the total internal reflection display contrast is increased, and the display effect of the display panel is improved.

BRIEF DESCRIPTION OF THE DRAWINGS

In order to illustrate the technical solutions of the present disclosure in a clearer manner, the drawings desired for the present disclosure or the related art will be described briefly hereinafter. Obviously, the following drawings merely relate to some embodiments of the present disclosure, and based on these drawings, a person skilled in the art may obtain the other drawings without any creative effort.

FIG. 1-2 is a structural schematic view of another display panel in related art;

FIG. 1-3 is a flowchart of a method for manufacturing a display panel provided in an embodiment of the present disclosure;

FIG. 2-1 is a flowchart of another method for manufacturing a display panel provided in an embodiment of the present disclosure;

FIG. 2-2 is a structural schematic view of forming a second electrode provided in the embodiment of the present disclosure;

FIG. 2-3 is a schematic view showing that the display panel assumes a dark display state provided in the embodiment of the present disclosure;

FIG. 2-4 is a schematic view showing the display panel assumes a bright display state provided in the embodiment of the present disclosure;

FIG. 2-5 is a structural schematic view of a display panel provided in an embodiment of the present disclosure;

FIG. 3-1 is a flowchart of yet another method for manufacturing a display panel provided in an embodiment of the present disclosure;

FIG. 3-2 is a structural schematic view of forming a second electrode provided in the embodiment of the present disclosure;

FIG. 3-3 is a structural schematic view of forming a reflecting component provided in the embodiment of the present disclosure;

FIG. 3-4 is a schematic view showing that the display panel assumes a dark display state provided in the embodiment of the present disclosure;

FIG. 3-5 is a schematic view showing that the display panel assumes a bright display state provided in the embodiment of the present disclosure; and FIG. 4 is a structural schematic view of a display panel provided in an embodiment of the present disclosure.

DETAILED DESCRIPTION

The present disclosure will be described hereinafter in conjunction with the drawings and embodiments. The following embodiments are for illustrative purposes only, but shall not be used to limit the scope of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
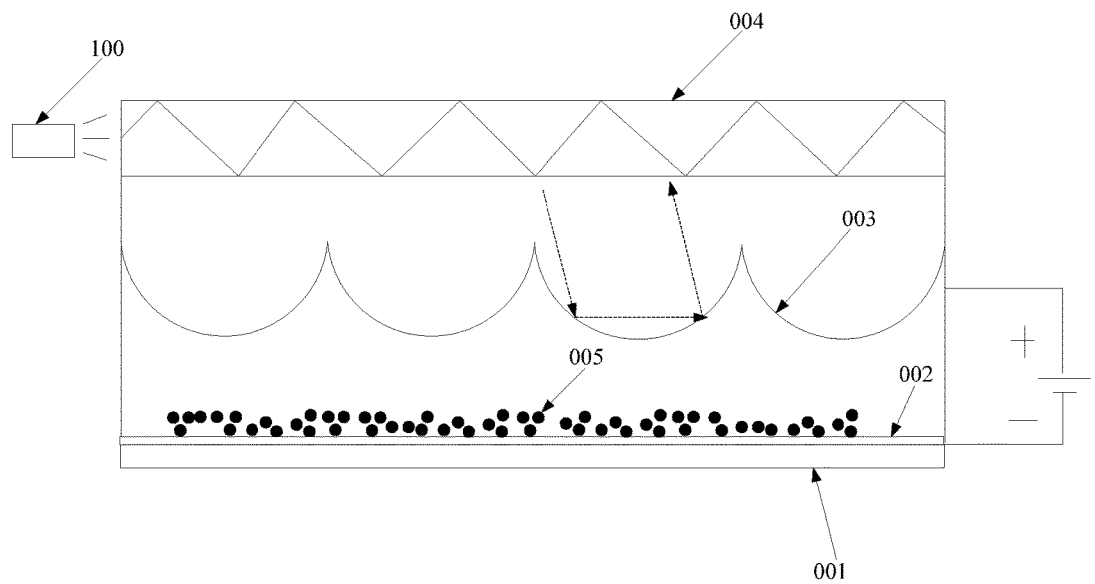
FIG. 1-1 is a structural schematic view of a display panel in related art.

FIG. 1-1 shows a structural schematic view of a display panel in related art. As shown in FIG. 1-1, the display panel comprises a support member 001 provided with a lower electrode 002, the support member 001 provided with the lower electrode 002 is provided with an upper electrode 003, and the support member 001 provided with an upper electrode 003 is provided with a light guide 004. charged particles 005 (also referred to as electrophoretically moving particles) are provided between the upper electrode 003 and the lower electrode 002, and located in a low refractive index medium (not shown in FIG. 1-1). Light emitted from a backlight 100 is incident on a display panel under an action of the light guide 004. Under an action of voltage difference between the upper electrode 003 and the lower electrode 002, the charged particles 005 can move to approach the lower electrode 002 or to approach the upper electrode 003. When the charged particles 005 moves to approach the lower electrode 002, light incident on the display panel is reflected by the upper electrode 003, and the display panel assumes a bright display state. When the charged particles 005 move to approach the upper electrode 003, the light incident on the display panel is absorbed by the charged particles 005, and the display panel assumes a dark display state. The upper electrode 003 is an arc-shaped structure. The arc-shaped structure enables the light incident on the display panel to return along the same way and thus functions to reflect the light. In practice, when the charged particles 005 move to approach the lower electrode 002, part of light incident on the display panel is reflected by the upper electrode 003, and the other part thereof passes through the upper electrode 003 and is absorbed by the charged particles 005. The upper electrode has poor reflecting effect of light, and the total internal reflection display contrast is poor.

Figures 1, 2:
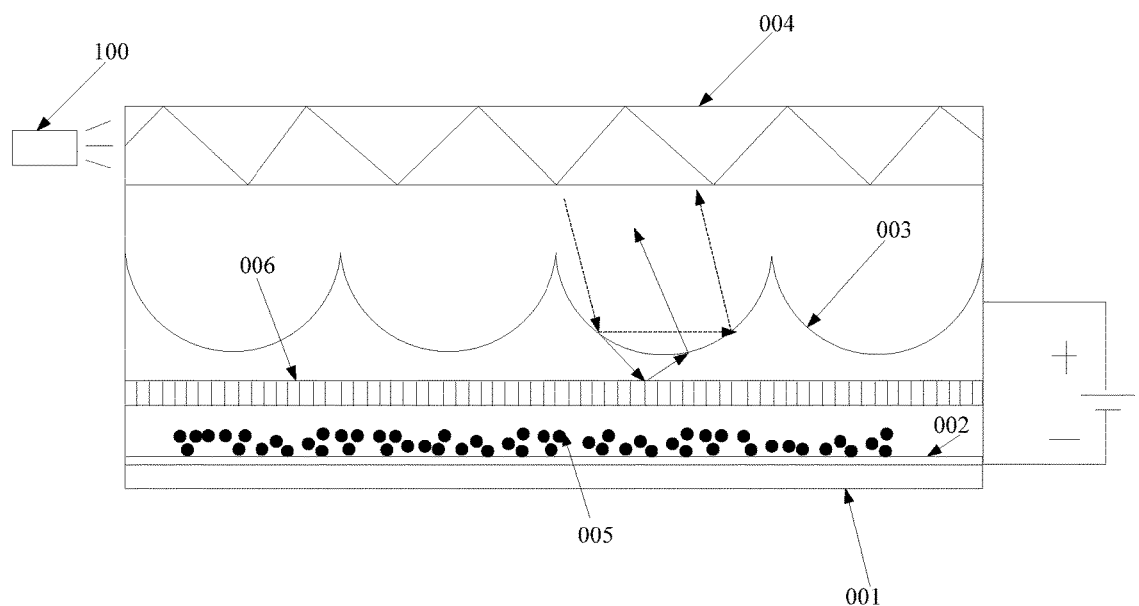

In order to solve this problem, a display panel is further provided in the related art, in which a support member 101 provided with a lower electrode 002 is provided with a porous reflecting film 006 that functions to reflect light, as shown in FIG. 1-2. In this way, when charged particles 005 move to approach the lower electrode 002, a part of light incident on the display panel is reflected by the upper electrode 003, and the other part thereof passes through the upper electrode 003 and is reflected by the porous reflecting film 006 (shown as an optical path indicated by a solid line in FIG. 1-2). However, since the porous reflecting film is formed with holes, the porous reflecting film will function to block the charged particles moving up and down. For example, when the charged particles move to approach the upper electrode, the porous reflecting film blocks the charged particles moving upward, and part of the charged particles are blocked in the holes of the porous reflecting film, so the light incident on the display panel is absorbed by less charged particles, and the charged particles have poor absorption effect of light. When the charged particles move to approach the lower electrode, the porous reflecting film blocks the charged particles moving downward, and part of the charged particles are blocked in the holes of the porous reflecting film, so light incident on the display panel may be absorbed by the charged particles blocked in the holes of the porous reflecting film, and the porous reflecting film has poor reflecting effect of light. Therefore, the total internal reflection display contrast will still be affected. For meanings of the remaining reference numerals in FIG. 1-2, you may refer to FIG. 1-1.

Figures 1, 2, 3:
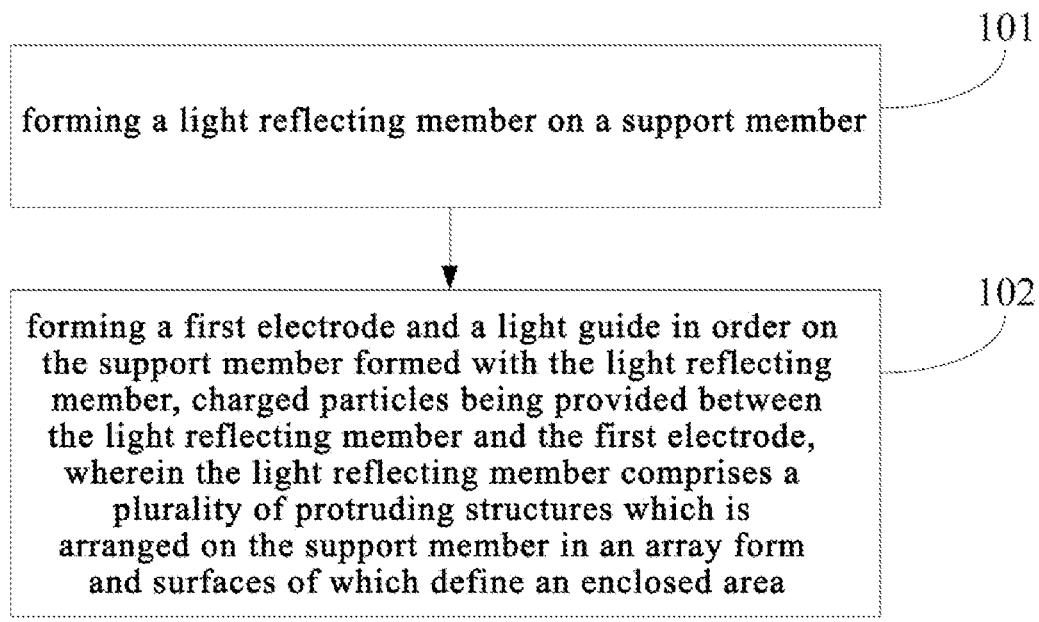

The present disclosure provides in an embodiment a method for manufacturing a display panel, which, as shown in FIG. 1-3, includes:

step 101: forming a light reflecting member on a support member in such a manner that the light reflecting member comprises a plurality of protruding structures which is arranged on the support member in an array form and surfaces of which define an enclosed area; and step 102: forming a first electrode and a light guide in order on the support member formed with the light reflecting member, charged particles being provided between the light reflecting member and the first electrode.

As stated above, in the method for manufacturing the display panel provided in the embodiment of the present disclosure, the support member is formed with the light reflecting member comprising a protruding structures, the surfaces of the plurality of protruding structures define an enclosed area, and areas between the protruding structures can receive charged particles. As compared with the porous reflecting film in related art, the protruding structures will not block the charged particles moving up and down, and enhance the effect of reflecting light when the display panel assumes a bright display state, and enhance the effect of absorbing light by the charged particles when the display panel assumes a dark display state. Therefore, the total internal reflection display contrast is increased, and the display effect of the display panel is improved.

The present disclosure provides in an embodiment another method for manufacturing a display panel, which, as shown in FIG. 2-1, includes:

step 201: forming a second electrode on a support member.

As shown in FIG. 2-2, a second electrode 02 is formed on a support member 001. The second electrode 02 comprises a plurality of protruding structures 021 which is arranged on the support member 001 in an array form and surfaces of which define an enclosed area. The surfaces of the plurality of protruding structures are smooth, which can enhance the effect of reflecting light. Areas between the protruding structures can receive charged particles.

In step 202, a first electrode and a light guide are formed in order on the support member formed with the second electrode.

As shown in FIG. 2-3, a first electrode 03 and a light guide 004 are formed in order on the support member 001 formed with the second electrode 02, and charged particles 005 are provided between the second electrode 02 and the first electrode 03. The charged particles 005 are located in a low refractive index medium (not shown in FIG. 2-3). The plurality of protruding structures may further achieve the effect of blocking lateral movement of the charged particles between adjacent pixels. In FIG. 2-3, an orthogonal projection of each arc-shaped first electrode on the array substrate is located in an area which overlaps with an area where one pixel is located.

Illustratively, referring to FIG. 2-3, light emitted from a backlight 100 is incident on a display panel under an action of a light guide 004. When a voltage difference between the first electrode 03 and the second electrode 02 is a positive value, the charged particles 005 move to approach the first electrode 03 (a direction indicated by u in FIG. 2-3). Light p1 incident on the display panel is absorbed by the charged particles 005, and the display panel assumes a dark display state. Since surfaces of the plurality of protruding structures 021 define an enclosed area, the plurality of protruding structures 021 does not block the moving charged particles 005, and will not affect a response speed of the charged particles 005. As compared with the display panel shown in FIG. 1-2, in the embodiment of the present disclosure, the charged particles can achieve better absorption effect of the light p1 and their absorption effect of light is enhanced.

Figures 1, 2:
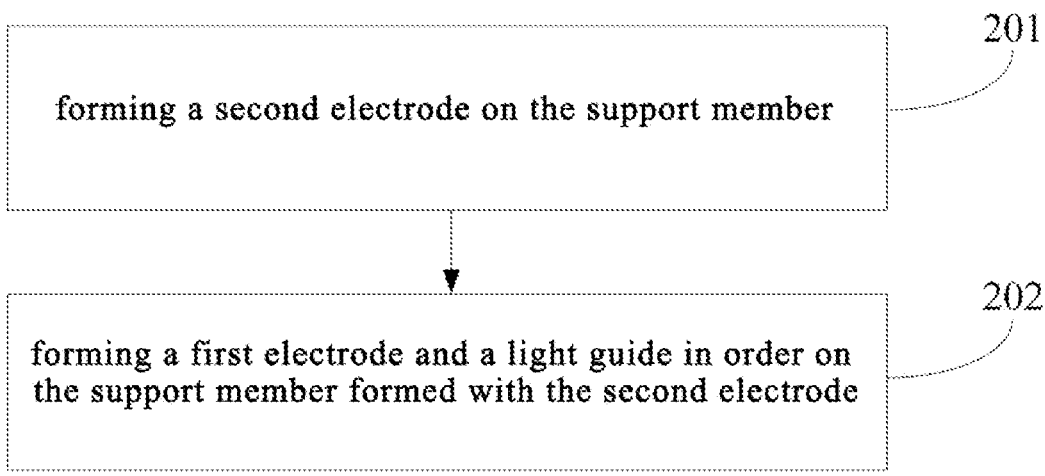
Figure 2:
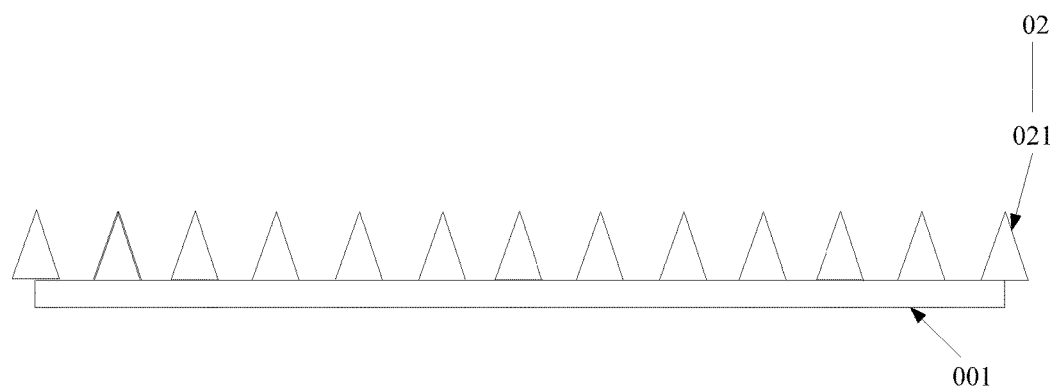
Figures 2, 3:
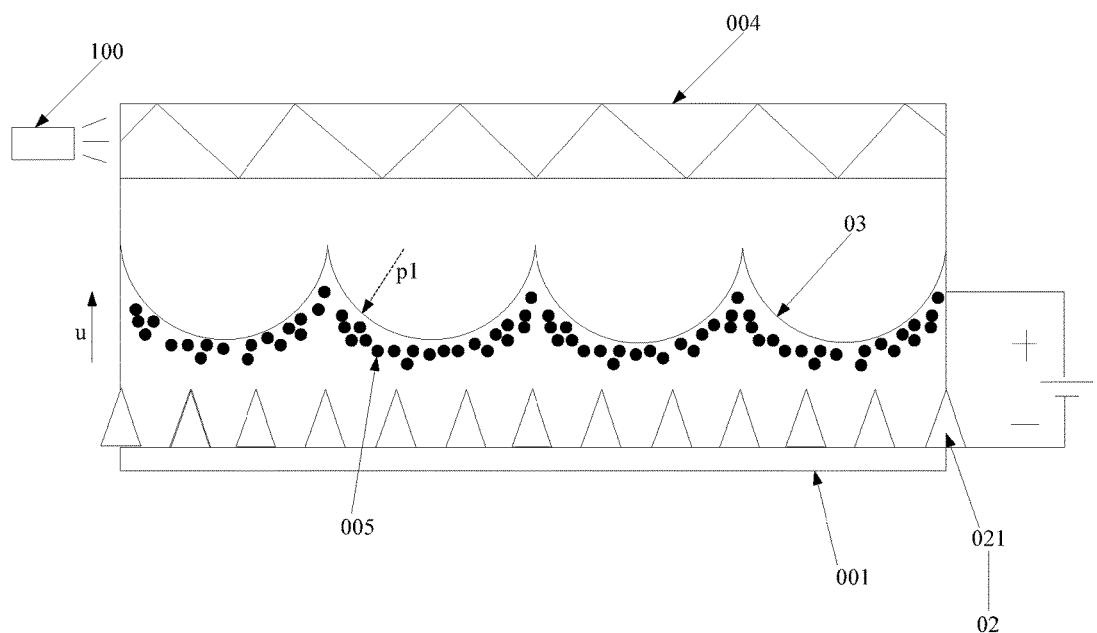
Figures 2, 3, 4:
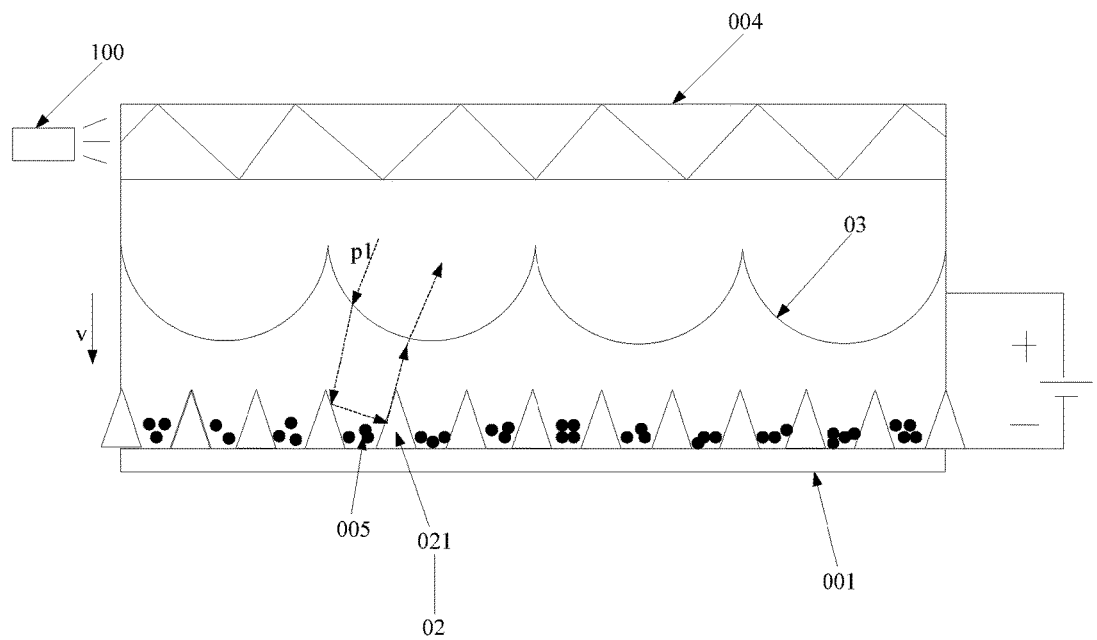

Referring to FIG. 2-4, light emitted from the backlight 100 is incident on the display panel under the action of the light guide 004. When the voltage difference between the first electrode 03 and the second electrode 02 is a negative value, the charged particles 005 move to approach the second electrode 02 (a direction indicated by v in FIG. 2-4). A part of light p1 incident on the display panel is reflected by the first electrode 03 (not shown in FIG. 2-4), and the other part thereof is reflected by protruding structures 021, so the display panel assumes a bright display state. Since the surfaces of the plurality of protruding structures 021 define an enclosed area, the plurality of protruding structures 021 does not block the moving charged particles 005, areas between the protruding structures can receive the charged particles, and the protruding structures will not affect a response speed of the charged particles 005. As compared with the display panel shown in FIG. 1-2, in the embodiment of the present disclosure, the protruding structures can achieve better reflecting effect of light p1, achieve the compensation of reflectivity of light, and enhance the reflecting effect of light. For meanings of other reference numerals in FIG. 2-4, you may refer to FIG. 2-3.

As can be seen from FIGS. 2-3 and 2-4, in a display panel manufactured using the method for manufacturing the display panel provided in the embodiment of the present disclosure, the effect of reflecting light by the protruding structures can be enhanced when the display panel assumes a bright display state, and the effect of absorbing light by the charged particles can be enhanced when the display panel assumes a dark display state. Therefore, the total internal reflection display contrast is increased, the display effect of the display panel is improved, and the effect of blocking the lateral movement of the charged particles between adjacent pixels is achieved.

On one hand, as shown in FIGS. 2-3 and 2-4, the plurality of protruding structures 021 have an identical height. The plurality of protruding structures having the identical height can increase the total internal reflection display contrast, and block the lateral movement of the charged particles between the adjacent pixels.

On the other hand, in order to further enhance the effect of blocking the lateral movement of the charged particles between the adjacent particles, the plurality of protruding structures 021 may have different heights. As shown in FIG. 2-5, the protruding structure (indicated by A in FIG. 2-5) of the plurality of protruding structures 021 located in a spacing area has a height h1 larger than a height d1 of the remaining protruding structures. The spacing area (indicated by B in FIG. 2-5) is an area where an orthogonal projection of an area between adjacent first electrodes 03 on the support member 001 is located. FIG. 2-5 illustratively shows one spacing area. You may refer to FIG. 2-4 for meanings of other reference numerals in FIG. 2-5.

It shall be added that, referring to FIG. 1-2, it is required to form the porous reflecting film and increase an extra film layer in order to increase the total internal reflection display contrast in the related art. Meanwhile, since the etching process of the porous reflecting film is highly complicated, and the porous reflecting film is relatively thick, the display panel has an increased thickness and cannot be adapted to the development trend of the present lighter and thinner display panels. In contrast, in the method for manufacturing the display panel provided in the embodiment of the present disclosure, it is not necessary to form the porous reflecting film and it is only required to make the second electrode into a plurality of protruding structures, which greatly simplifies the manufacturing process of the display panel and does not increase the thickness of the display panel.

To sum up, in the method for manufacturing the display panel provided in the embodiment of the present disclosure, the support member is formed with the second electrode comprising the plurality of protruding structures, and the surfaces of the plurality of protruding structures define an enclosed area, and areas between the protruding structures can receive charged particles. As compared with the porous reflecting film in related art, the protruding structures will not block the charged particles moving up and down, and enhance the effect of reflecting light when the display panel assumes a bright display state, and enhance the effect of absorbing light by the charged particles when the display panel assumes a dark display state. Therefore, the total internal reflection display contrast is increased, and the display effect of the display panel is improved. Moreover, the manufacturing process of the display panel is also simplified, and the thickness of the display panel is not increased.

The present disclosure provides in an embodiment yet another method for manufacturing a display panel, which, as shown in FIG. 3-1, includes:

step 301: forming a second electrode on a support member.

As shown in FIG. 3-2, a second electrode 02 is formed on a support member 001.

In step 302, a reflecting component that comprises a plurality of protruding structures is formed on the support member formed with the second electrode.

As shown in FIG. 3-3, a reflecting component 04 is formed on the support member 001 formed with the second electrode 02. The reflecting component 04 comprises a plurality of protruding structures 041. The plurality of protruding structures 041 are arranged on the second electrode 02 in an array form. Surfaces of the plurality of protruding structures 041 define an enclosed area. The surfaces of the plurality of protruding structures are smooth, and can enhance the effect of reflecting light. The areas between the protruding structures can receive the charged particles.

In step 303, a first electrode and a light guide are formed in order on the support member formed with the reflecting component.

As shown in FIG. 3-4, a first electrode 03 and a light guide 004 are formed in order on the support member 001 formed with the reflecting component 04, and charged particles 005 are provided between the second electrode 02 and the first electrode 03. The charged particles 005 are located in a low refractive index medium (not shown in FIG. 3-4). The plurality of protruding structures can achieve the effect of blocking lateral movement of the charged particles between adjacent pixels.

Illustratively, referring to FIG. 3-4, light emitted from a backlight 100 is incident on the display panel under an action of the light guide 004. When a voltage difference between the first electrode 03 and the second electrode 02 is a positive value, the charged particles 005 move to approach the first electrode 03 (a direction indicated by u in FIG. 3-4). Light p1 incident on the display panel is absorbed by the charged particles 005 and the display panel assumes a dark display state. Since the surfaces of the plurality of protruding structures 0041 define an enclosed area, the plurality of protruding structures 041 has no blocking effect on the moving charged particles 005, and do not affect a response speed of the charged particles 005. As compared with the display panel shown in FIG. 1-2, the charged particles in the embodiment of the present disclosure can achieve better absorption effect of the light p1 and their absorption effect of light is enhanced. You may refer to FIG. 3-3 for meaning of the other reference numerals in FIG. 3-4.

Figures 2, 3, 4, 5:
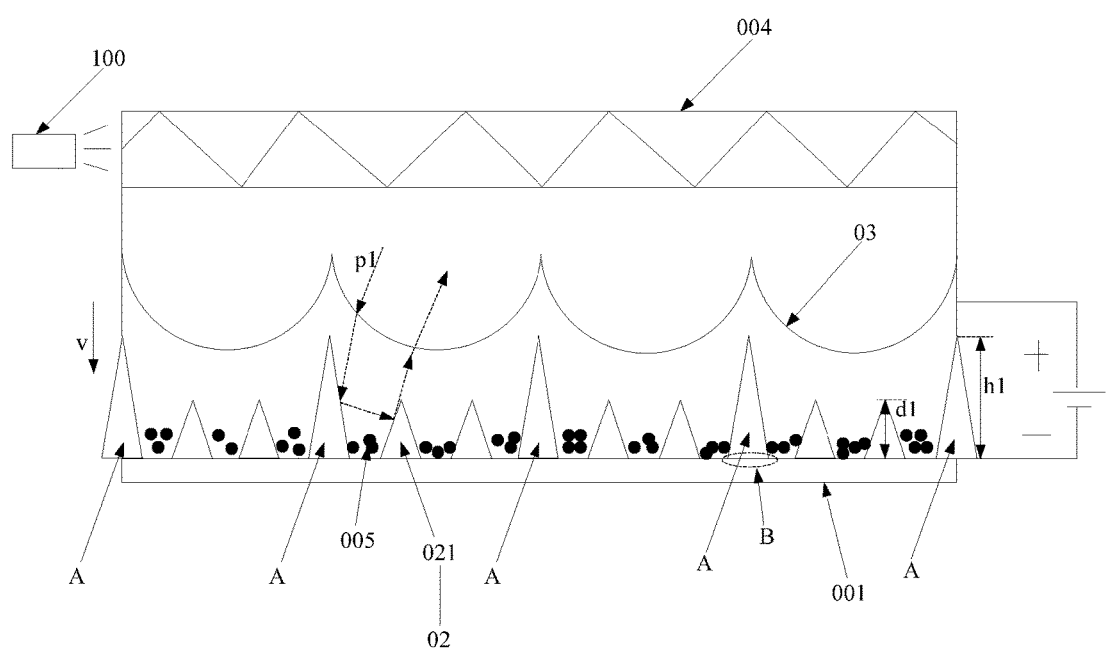
Figures 1, 3:
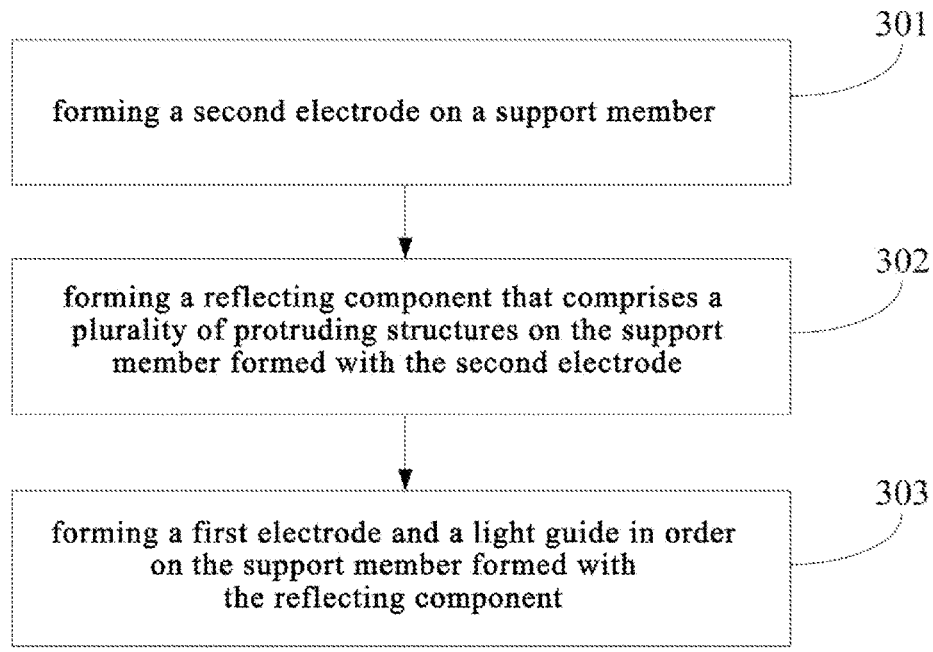
Figures 2, 3:
Figure 3:
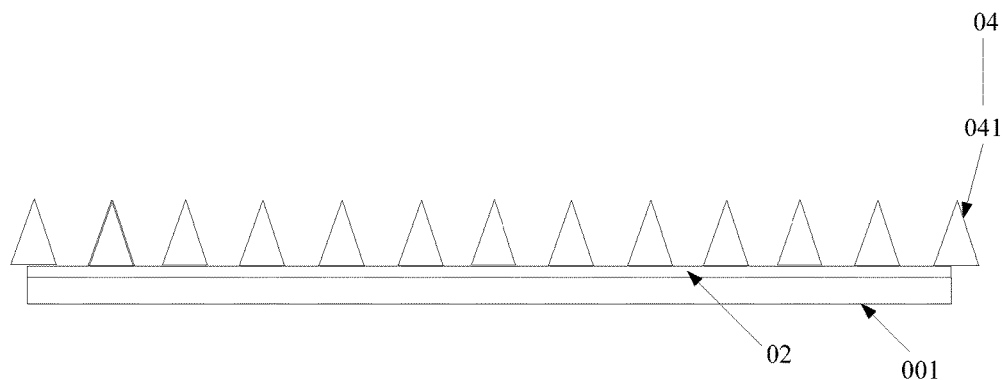
Figures 3, 4:
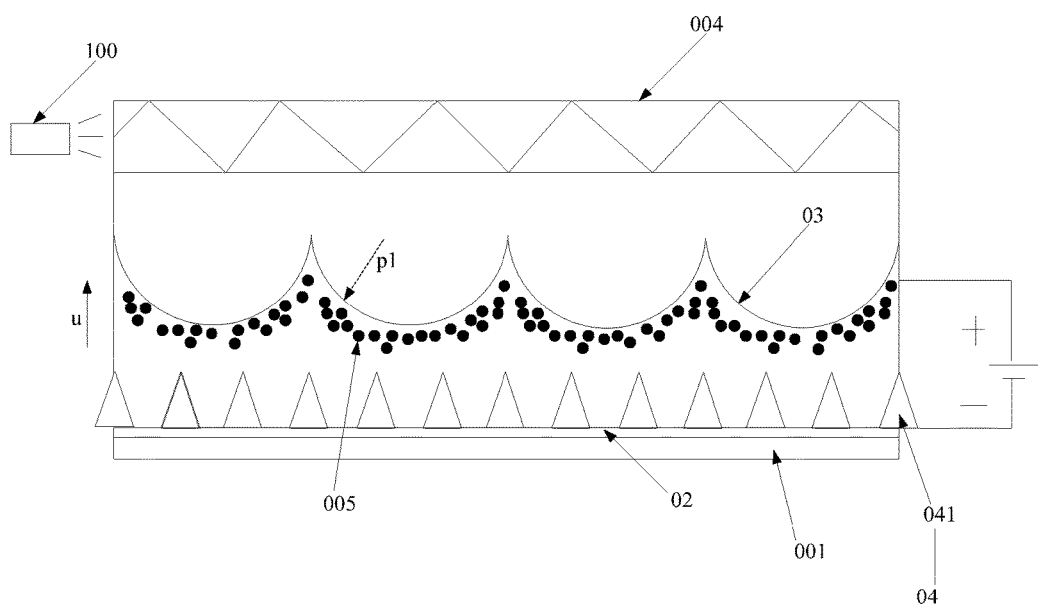
Figures 3, 4, 5:
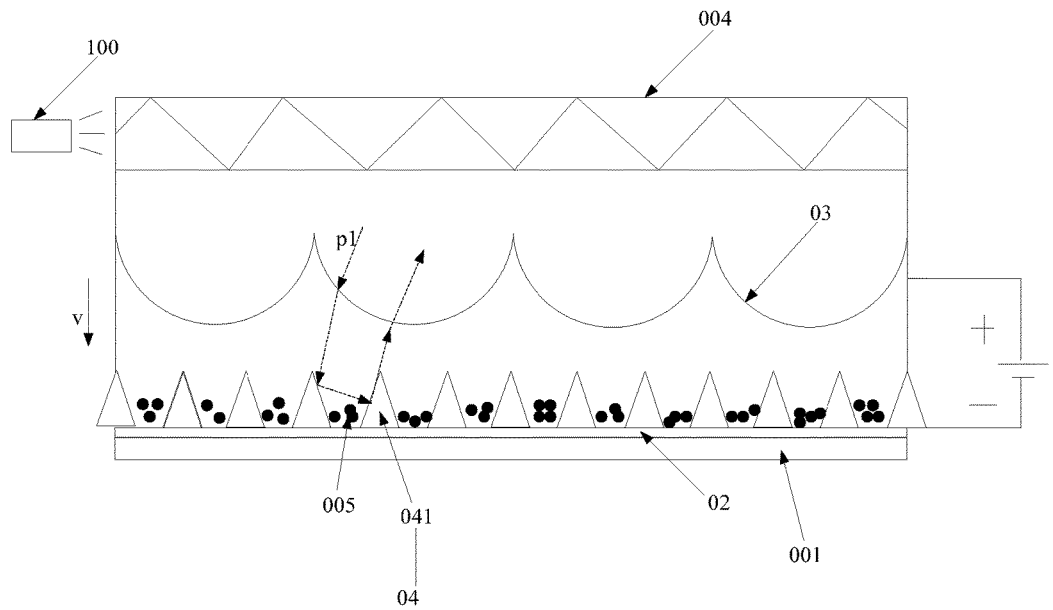
Figure 4:
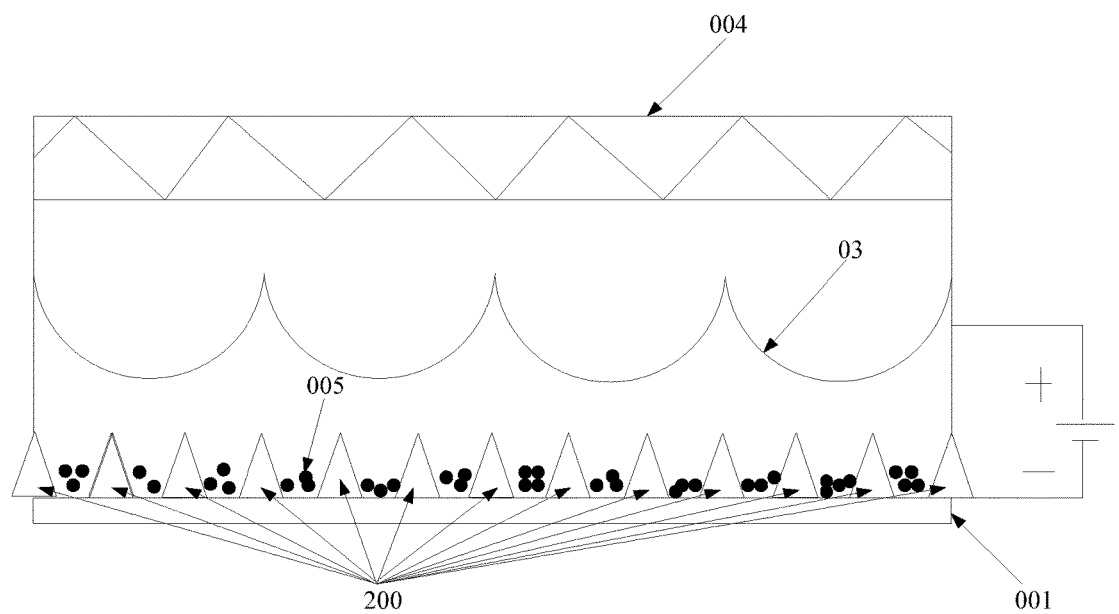

Referring to FIG. 3-5, light emitted from the backlight 100 is incident on the display panel under the action of the light guide 004. When the voltage difference between the first electrode 03 and the second electrode 02 is a negative value, the charged particles 005 move to approach the second electrode 02 (a direction indicated by v in FIG. 3-5), and a part of light p1 incident on the display panel is reflected by the first electrode 03 (not shown in FIG. 3-5), and the other part thereof is reflected by the protruding structures 041, so the display panel assumes a bright display state. Since the surfaces of the plurality of protruding structures 041 define an enclosed area, the plurality of protruding structures 041 has no blocking effect on the moving charged particles 005. The areas between the protruding structures can receive the charged particles, and the protruding structures do not affect the response speed of the charged particles 005. As compared with the display panel shown in FIG. 1-2, the protruding structures in the embodiment of the present disclosure can achieve better reflecting effect of the light p1, achieve the compensation of reflectivity of light, and enhance the reflecting effect of light. You may refer to FIG. 3-4 for meanings of the other reference numerals in FIG. 3-5.

As can be seen in conjunction with FIGS. 3-4 and 3-5, the display panel manufactured using the method for manufacturing the display panel provided in the embodiment of the present disclosure is capable of enhancing the effect of reflecting light by the protruding structures when assuming a bright display state, and enhancing the effect of absorbing light by the charged particles when assuming a dark display state. Therefore, the total internal reflection display contrast is increased, the display effect of the display panel is improved and the effect of blocking the lateral movement of the charged particles between adjacent pixels is achieved.

On one hand, as shown in FIGS. 3-4 and 3-5, the plurality of protruding structures 041 has an identical height. The plurality of protruding structures having the identical height can increase the total internal reflection display contrast and block the lateral movement of the charged particles between adjacent pixels.

On the other hand, in order to further enhance the effect of blocking the lateral movement of the charged particles between the adjacent pixels, the plurality of protruding structures may have different heights. As shown in FIG. 2-5, a protruding structure of the plurality of protruding structures located in a spacing area, which is an area where an orthogonal projection of an area between adjacent first electrodes on the support member is located, has a height larger than the remaining protruding structures.

To sum up, in the method for manufacturing the display panel provided in the embodiment of the present disclosure, the support member is formed with the second electrode, the support member formed with the second electrode is formed with the reflecting component comprising the plurality of protruding structures, the surfaces of the protruding structures define an enclosed area, and areas between the protruding structures can receive charged particles. As compared with the porous reflecting film in related art, the protruding structures will not block the charged particles moving up and down, and enhance the effect of reflecting light when the display panel assumes a bright display state, and enhance the effect of absorbing light by the charged particles when the display panel assumes a dark display state. Therefore, the total internal reflection display contrast is increased, and the display effect of the display panel is improved.

It shall be noted that, the order of the method for manufacturing the display panel provided in the embodiment of the present disclosure can be appropriately adjusted, and the steps may be also reduced or increased as desired, and a person skilled in the art may easily envisage modified methods within the technical scope of the present disclosure, and such modified methods shall be encompassed within the scope of the present disclosure and will not be illustrated here.

The present disclosure provides in an embodiment a display panel which, as shown in FIG. 4, includes:

a support member 001;

a light reflecting member 200 provided on the support member 001; and a first electrode 03 and a light guide 004 provided in order on the support member 001 provided with the light reflecting member 200, wherein charged particles 005 are provided between the light reflecting member 200 and the first electrode 03 and located in a low refractive index medium.

The light reflecting member 200 comprises a plurality of protruding structures which is arranged on the support member in an array form and surfaces of which define an enclosed area.

To sum up, in the display panel provided in the embodiment of the present disclosure, the light reflecting member of the display panel comprises the plurality of protruding structures, the surfaces of the plurality of protruding structures define an enclosed area and the areas between the protruding structures can receive the charged particles. As compared with the porous reflecting film, the protruding structures have no blocking effect on the charged particles moving up and down, and enhance the effect of reflecting light when the display panel assumes a bright display state, and enhance the effect of absorbing light when the display panel assumes a dark display state. Therefore, the total internal reflection display contrast is increased and the display effect of the display panel is improved.

Optionally, as shown in FIGS. 2-3 and 2-4, the light reflecting member is the second electrode 02. When the light reflecting member is the second electrode, the display panel has a simple structure and the thickness of the display panel is not increased.

Optionally, as show in FIGS. 3-4 and 3-5, the light reflecting member comprises the second electrode 02 and the reflecting component 04. The second electrode 02 is provided on the support member 001, and the reflecting component 04 is provided on the second electrode 02 and comprises the plurality of protruding structures 041. Illustratively, the reflecting component is made of a metal oxide or other material with high reflectivity.

Optionally, in order to enhance the effect of blocking the lateral movement of the charged particles between adjacent pixels, as shown in FIG. 2-5, a protruding structure of the plurality of protruding structures located in a spacing area has a height larger than the remaining protruding structures. The spacing area is an area where an orthogonal projection of an area between adjacent first electrodes on the support member is located.

To sum up, in the display panel provided in the embodiment of the present disclosure, the light reflecting member of the display panel comprises the plurality of protruding structures, the surfaces of the plurality of protruding structures define an enclosed area and the areas between the protruding structures can receive the charged particles. As compared with the porous reflecting film in related art, the protruding structures will not block the charged particles moving up and down, and enhance the effect of reflecting light when the display panel assumes a bright display state, and enhance the effect of absorbing light by the charged particles when the display panel assumes a dark display state. Therefore, the total internal reflection display contrast is increased, and the display effect of the display panel is improved, and the effect of blocking the lateral movement of the charged particles between the adjacent pixels is achieved.

The present disclosure provides in an embodiment a display device that comprises the display panel shown in FIG. 2-3, 2-5, 3-4 or 4.

To sum up, the light reflecting member of the display panel included in the display device provided in the embodiment of the present disclosure comprises the plurality of protruding structures, the surfaces of the plurality of protruding structures define an enclosed area and the areas between the protruding structures can receive the charged particles. As compared with the porous reflecting film in the related art, the protruding structures have no blocking effect on the charged particles moving up and down, and enhance the effect of reflecting light when the display panel assumes a bright display state, and enhance the effect of absorbing light by the charged particles when the display panel assumes a dark display state. Therefore, the total internal reflection display contrast is increased and the display effect of the display panel is improved.

A person skilled in the art to which the present disclosure pertains can clearly know that, the forgoing embodiments of the method can be referred to for embodiments of the device described above for the convenience and simplicity of description, and the embodiments of the device will not be described in detail here.

It can be understood by those skilled in the art that all or some of the steps for implementing the above method embodiments can be achieved by hardware or hardware related to programs and instructions, which programs may be stored in a computer readable storage medium, which may be ROM, magnetic disk or optical disk The above are merely the preferred embodiments of the present disclosure and are not intended to limit the present disclosure. All of modifications, equivalent alternatives, improvements, etc made within the spirit and principle of the present disclosure should be encompassed within the protection scope of the present disclosure.

What is claimed is:

1. A method for manufacturing a display panel, comprising:
forming a light reflecting member on a support member in such a manner that the light reflecting member comprises a plurality of protruding structures which is arranged on the support member in an array form and surfaces of which define an enclosed area; and
forming a first electrode and a light guide in order on the support member formed with the light reflecting member, charged particles being provided between the light reflecting member and the first electrode;
wherein a protruding structure of the plurality of protruding structures located in a spacing area, which is an area where an orthogonal projection of an area between adjacent portions of the first electrode on the support member is located, has a height larger than a height of another protruding structure of the plurality of protruding structures.

2. The method according to claim 1, wherein the light reflecting member is a second electrode.

3. The method according to claim 1, wherein the forming the light reflecting member on the support member comprises:
forming a second electrode on the support member; and
forming a reflecting component comprising the plurality of protruding structures on the support member formed with the second electrode.

4. The method according to claim 1, wherein the surfaces of the plurality of protruding structures are smooth.

5. A display panel comprising:
a support member;
a light reflecting member provided on the support member; and
a first electrode and a light guide arranged in order on the support member provided with the light reflecting member,
wherein charged particles are provided between the light reflecting member and the first electrode;
wherein the light reflecting member comprises a plurality of protruding structures which is arranged on the support member in an array form and surfaces of which define an enclosed area, and wherein a protruding structure of the plurality of protruding structures located in a spacing area, which is an area where an orthogonal projection of an area between adjacent portions of the first electrode on the support member is located, has a height larger than a height of another protruding structure of the plurality of protruding structures.

6. The display panel according to claim 5, wherein the light reflecting member is a second electrode.

7. The display panel according to claim 5, wherein the light reflecting member comprises a second electrode and a reflecting component,
the second electrode is provided on the support member, and
the reflecting component is provided on the second electrode and comprises the plurality of protruding structures.

8. The display panel according to claim 7, wherein the reflecting component is made of a metal oxide.

9. The display panel according to claim 5, wherein the surfaces of the plurality of protruding structures are smooth.

10. A display device, comprising the display panel according to claim 5.

11. The display device according to claim 10, wherein the light reflecting member is a second electrode.

12. The display device according to claim 10, wherein the light reflecting member comprises a second electrode and a reflecting component,
the second electrode is provided on the support member, and
the reflecting component is provided on the second electrode and comprises the plurality of protruding structures.

13. The display device according to claim 12, wherein the reflecting component is made of a metal oxide.

14. The display device according to claim 10, wherein the surfaces of the plurality of protruding structures are smooth.

15. The method according to claim 1, wherein each of the plurality of protruding structures comprises a triangular prism.

16. The display panel according to claim 5, wherein each of the plurality of protruding structures comprises a triangular prism.

17. The display device according to claim 10, wherein each of the plurality of protruding structures comprises a triangular prism.

* * * * *